United States Patent [19]

Sorensen

[11] Patent Number: 4,846,483

[45] Date of Patent: Jul. 11, 1989

[54] MANDREL SYSTEM FOR RECEIVING CUP HAVING SIDE WALL RIBBED INTERIOR SURFACE FOR PRINTING ON EXTERIOR SURFACE OF SIDE WALL

[75] Inventor: Jens O. Sorensen, Rancho Santa Fe, Calif.

[73] Assignee: Acebo Company, La Jolla, Calif.

[21] Appl. No.: 225,056

[22] Filed: Jul. 27, 1988

[51] Int. Cl.[4] .......................... B23B 31/00; B41F 17/28

[52] U.S. Cl. .......................................... 279/3; 101/40; 118/50; 269/21

[58] Field of Search .............. 279/3; 101/39, 40, 38.1, 101/40.1, 382.1, 389.1, 475; 118/50, 46, 500, 502; 269/21; 51/235

[56] References Cited

U.S. PATENT DOCUMENTS

| | | | |
|---|---|---|---|
| 3,147,017 | 9/1964 | Dunham | 279/3 |
| 3,236,533 | 2/1966 | Mullion | 279/3 |
| 3,598,043 | 8/1971 | Schuff | 101/40 |
| 3,661,282 | 5/1972 | Buhayar et al. | 101/40 |
| 4,380,964 | 4/1983 | Abe et al. | 279/3 |
| 4,722,271 | 2/1988 | Fielrooy | 101/39 |

*Primary Examiner*—Gil Weidenfeld

*Assistant Examiner*—Daniel W. Howell

*Attorney, Agent, or Firm*—Edward W. Callan

[57] ABSTRACT

In a mandrel system for receiving a cup-like product having a side wall with a ribbed interior surface, the exterior portion of the mandrel wall is adapted to firmly engage the interior surface of the product side wall in the regions between the ribs and to enhance interior backing of the product side wall in the regions between the ribs. In one embodiment, the exterior portion of the mandrel wall includes a compressible material. In another embodiment, the exterior surface of the mandrel wall includes channels for receiving the ribs on the interior surface of the product side wall. The mandrel wall is apertured to enable air to flow through the mandrel wall to draw the product into firm engagement with the mandrel when a vacuum is created inside the mandrel. The vacuum sucks air into the mandrel through the apertures as the product is being received by the mandrel; and the mandrel is rotated with respect to the product as the product is being received by the mandrel at least until the channels of the mandrel engage the ribs on the interior surface of the product side wall to engage the vacuum to draw the product into firm engagement with the mandrel.

10 Claims, 1 Drawing Sheet

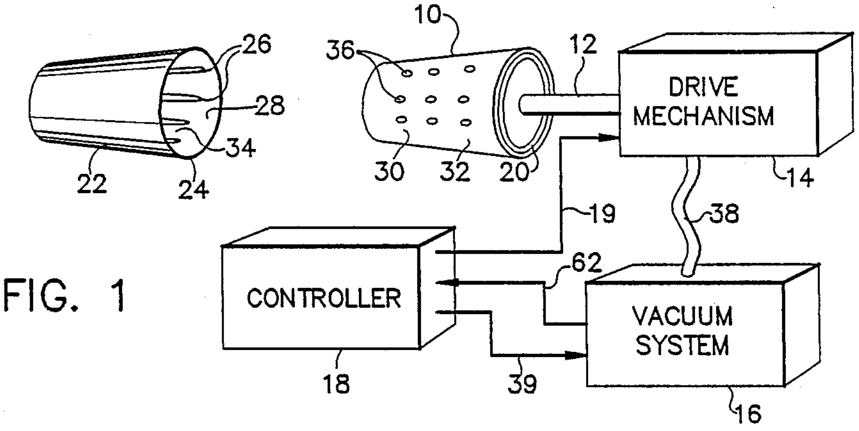
FIG. 1
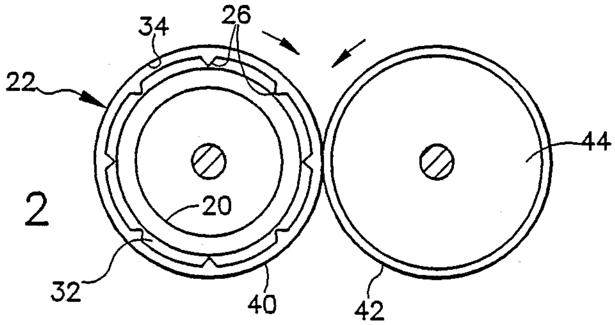
FIG. 2
FIG. 3
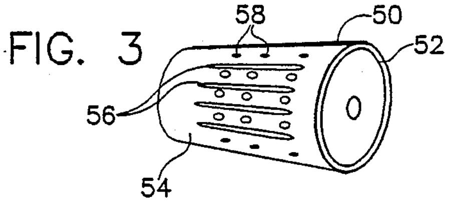
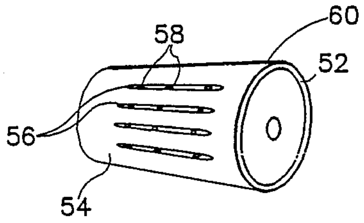
FIG. 4

MANDREL SYSTEM FOR RECEIVING CUP HAVING SIDE WALL RIBBED INTERIOR SURFACE FOR PRINTING ON EXTERIOR SURFACE OF SIDE WALL

BACKGROUND OF THE INVENTION

The present invention pertains to mandrel systems for receiving a hollow cup-like product for printing on the exterior surface of the product side wall.

In a typical prior art mandrel system, the hollow cup-like product is received on a mandrel and rotated by the mandrel against one or more print rollers. The print rollers have a soft exterior pad of a material, such as soft rubber, to which imaging material, such as paint or ink, is applied to predetermined areas and held to define the mirror image of a desired image. The desired image is applied to the exterior surface of the side wall of the cup-like product when the print roller and the product are engaged and rotated to transfer the imaging material from the print roller to the product.

The all of the mandrel includes apertures. As the product is being received by the mandrel, a vacuum is created inside the mandrel, whereby air is sucked into the mandrel through the apertures to cause the product to be drawn into firm engagement with the mandrel. After the mandrel has been rotated in order to rotate the product against the print rollers, the air flow within the mandrel is reversed so that air flows out through the apertures in the mandrel wall to thereby force the product from the mandrel.

The exterior surface of the mandrel wall that engages the interior surface of the side wall of the cup-like product is smooth, except for the apertures, in order to match the smooth interior-surface contour of a typical cup-like product side wall. When the interior surface of the product side wall is not smooth, however, such as when the interior surface of the product side wall includes ribs, certain problems arise. The absence of a uniformly smooth engagement between the mandrel and the interior surface of the product side wall necessitates the application of a greater vacuum force to hold the product in firm engagement with the mandrel so that the product will not slip while being rotated by the mandrel against the print rollers. Also, if the product has a thin side wall that is somewhat flexible, the force applied to the side wall of the product by the print rollers during their engagement with the product may bend the product in the regions between the ribs and thereby cause an inexact transfer of the image from the print rollers to the exterior surface of the product side wall.

SUMMARY OF THE INVENTION

The mandrel system of the present invention includes a mandrel having a wall for receiving a cup-like product having a side wall with a ribbed interior surface, wherein the exterior portion of the mandrel wall is adapted to firmly engage the interior surface of the product side wall in the regions between the ribs and to enhance interior backing of the product side wall in the regions between the ribs.

In one aspect of the present invention, the exterior portion of the mandrel wall includes a compressible material for firmly engaging the interior surface of the product side wall in the regions between the ribs and for enhancing interior backing of the product side wall in the regions between the ribs.

In another aspect of the present invention the exterior surface of the mandrel wall includes channels for receiving the ribs on the interior surface of the product side wall in order to enable the exterior surface of the mandrel wall to firmly engage the product in the regions between the ribs and to provide interior backing of the product side wall in the regions between the ribs. In such a system in which the mandrel wall is apertured to enable air to flow through the mandrel wall to draw the product into firm engagement with the mandrel when a vacuum is created inside the mandrel, vacuum means suck air into the mandrel through the apertures as the product is being received by the mandrel; and the mandrel is rotated with respect to the product as the product is being received by the mandrel at least until the channels of the mandrel engage the ribs on the interior surface of the product side wall to enable the vacuum means to draw the product into firm engagement with the mandrel.

Additional features of the present invention are described in relation to the description of the preferred embodiment.

BRIEF DESCRIPTION OF THE DRAWING

FIG. 1 is a diagram of a preferred embodiment of the mandrel system of the present invention.

FIG. 2 is a sectional view illustrating rotary engagement between a print roller and a cup received by the mandrel of the mandrel system of FIG. 1.

FIG. 3 illustrates an alternative embodiment of the exterior surface of the mandrel wall for use in the system of FIG. 1.

FIG. 4 illustrates another alternative embodiment of the exterior surface of the mandrel wall for use in the system of FIG. 1.

DESCRIPTION OF THE PREFERRED EMBODIMENT

Referring to FIG. 1, a preferred embodiment of the mandrel system of the present invention includes a mandrel 10, a drive shaft 12, a drive mechanism 14, a vacuum system 16 and a controller 18.

The mandrel 10 is coupled to the drive mechanism 14 by the drive shaft 12. The drive mechanism 14 drives the drive shaft 12 to rotate the mandrel 10 in response to a control signal communicated over line 19 from the controller 18.

The mandrel 10 has a wall 20 for receiving a cup-like product 22 having a side wall 24 with ribs 26 on the interior surface 28 of the side wall 24. The exterior portion 30 of the mandrel wall 20 includes a readily compressible material layer 32 in order to firmly engage the interior surface 28 of the product side wall 24 in the regions 34 of interior surface 28 between the ribs 26 and in order to enhance interior backing of the product side wall 24 in the regions 34 between the ribs 26. The compressible material layer 32 is a rubber or plastic foam pad. The mandrel wall 20, including the exterior portion 30, thereof includes apertures 36, which enable air to flow through the mandrel wall 20 to draw the product 22 into firm engagement with the mandrel 10 when a vacuum is created inside the mandrel 10.

The vacuum system 16 is coupled to the interior of the mandrel 10 by a hose 38 and the drive shaft 12, which is hollow. The vacuum system 14 creates a vacuum inside the mandrel 10 in response to a control signal over line 39 from the controller 18.

After the product 22 has been drawn into firm engagement with the mandrel 10, the mandrel 10 is positioned so that the exterior surface 40 of the product side wall 24 engages the exterior pad 42 of a print roller 44, as shown in FIG. 2. The mandrel 10 and the print roller 44 rotate in opposite directions to cause imaging material held by the print roller pad 40 to be transferred to the exterior surface 40 of the product 22. The exterior pad 30 of the mandrel 10 applies interior backing to the side wall 24 of the product 22 in the regions 34 between the ribs 28 to counteract the force applied by the print roller 44 to the side wall 24 in the regions 34 in order to prevent the product 22 from bending in the regions 34 between the ribs 26 to such an extent that a significantly distorted image is transferred to the exterior surface 40 of the product 22.

When multiple colors are to be printed onto the exterior surface 40 of the product 22, the mandrel 10 may be repositioned to engage the exterior surface 40 with a different print roller 44 for each color of imaging material used in the printing process.

After the printing process is completed, the mandrel 10 is repositioned away from the print rollers 44, and a control signal communicated over line 39 from the controller 18 to the vacuum system 16 causes the vacuum system 16 to reverse the direction of the air flow inside the mandrel 10, whereby air is blown out through the apertures 36 to thereby force the product 22 from the mandrel 10.

An alternative preferred embodiment of a mandrel 50 that may be used in the mandrel system of FIG. 1 in lieu of the mandrel 10 is illustrated in FIG. 3.

The mandrel 50 has a wall 52 for receiving the cup-like product 22 shown in FIG. 1. The exterior surface 54 of the mandrel wall 52 includes channels 56 for receiving the ribs 26 on the interior surface 28 of the product side wall 24 in order to enable the exterior surface 54 of the mandrel wall to firmly engage the product 22 in the regions 34 between the ribs 26 and to provide interior backing of the product side wall 24 in the regions between the ribs 34. The mandrel wall 52 includes apertures 58, which enable air to flow through the mandrel wall 52 to draw the product 22 into firm engagement with the mandrel 50 when a vacuum is created inside the mandrel 50. In the embodiment of FIG. 3, the apertures 58 are located in the regions 60 of the mandrel wall 52 between the channels 56. In another alternative embodiment, which is shown in FIG. 4, the apertures 58 are located in the channels 56. In other respects, the embodiment of the mandrel 60 shown in FIG. 4 is identical to the embodiment of the mandrel 50 shown in FIG. 3.

As the product 22 is being received by the mandrel 50, a vacuum is created inside the mandrel 50 to suck air through the apertures 58 into the interior of the mandrel 50; and the mandrel is rotated with respect to the product 22 until the channels 56 of the mandrel 50 engage the ribs 26 on the interior surface 28 of the product side wall 24 to enable the vacuum to draw the product 22 into firm engagement with the mandrel 50. Once the product 22 is firmly engaged with the mandrel 50, a pressure change is sensed within the vacuum system 16; and in response to sensing such pressure change, a signal is sent to the controller 18 over the line 62 for causing the controller to send a signal to the drive mechanism 14 for terminating the rotation of the mandrel 50. The mandrel 50 is then positioned to engage the exterior surface of the product 22 with a print roller 44, as described above with reference to FIG. 2. In an alternative embodiment, the product 22 may be rotated, with the mandrel 50 either remaining stationary or being rotated at a different speed and/or in a different direction while the product 22 is being received on the mandrel 50.

Although the mandrel system of the present invention is illustrated as engaging a product having interior ribs that are generally longitudinal, it should be understood, that the mandrel system of the present invention is useful for engaging products having interior ribs in many other configurations.

I claim:

1. A mandrel system for receiving a cup-like product, having a side wall with a ribbed interior surface, for printing on the exterior surface of the product side wall, comprising a mandrel having a wall for receiving a cup-like product having a side wall with a ribbed interior surface, wherein the exterior portion of the mandrel wall has means to firmly engage the interior surface of the product side wall in the regions between the ribs and to enhance interior backing of the product side wall in the regions between the ribs.

2. A mandrel system according to claim 1, wherein the mandrel wall is apertured to enable air to flow through the mandrel wall, the system further comprising vacuum means for sucking air into the mandrel through the apertures as the product is being received by the mandrel to draw the product into firm engagement with the mandrel when a vacuum is created inside the mandrel; and wherein the exterior portion of the mandrel wall comprises a compressible material for firmly engaging the interior surface of the product side wall in the regions between the ribs and for enhancing interior backing of the product side wall in the regions between the ribs.

3. A mandrel system according to claim 1, wherein the mandrel wall is apertured to enable air to flow through the mandrel wall, the system further comprising vacuum means for sucking air into the mandrel through the apertures as the product is being received by the mandrel to draw the product into firm engagement with the mandrel when a vacuum is created inside the mandrel; and wherein the exterior surface of the mandrel wall includes channels for receiving the ribs on the interior surface of the product side wall in order to enable the exterior surface of the mandrel wall to firmly engage the product in the regions between the ribs and to provide interior backing of the product side wall in the regions between the ribs.

4. A mandrel system according to claim 3, further comprising means for effecting relative rotation between the mandrel and the product as the product is being received by the mandrel until the product is firmly engaged by the mandrel.

5. A mandrel system according to claim 3, further comprising means for rotating the mandrel with respect to the product as the product is being received by the mandrel at least until the channels of the mandrel engage the interior ribs on the interior surface of the product side wall to enable the vacuum means to draw the product into firm engagement with the mandrel.

6. A mandrel system according to claim 3, wherein the apertures are located in the channels.

7. A mandrel system according to claim 3, wherein the apertures are located between the channels.

8. A mandrel system according to claim 1, wherein the exterior portion of the mandrel wall comprises a compressible material for firmly engaging the interior surface of the product side wall in the regions between the ribs and for enhancing interior backing of the product side wall in the regions between the ribs.

9. A mandrel system according to claim 1, wherein the exterior surface of the mandrel wall includes channels for receiving the ribs on the interior surface of the product side wall in order to enable the exterior surface of the mandrel wall to firmly engage the interior surface of the product side wall in the regions between the ribs and to provide interior backing of the product side wall in the regions between the ribs.

10. A mandrel system according to claim 9, further comprising means for effecting relative rotation between the mandrel and the product as the product is being received by the mandrel until the product is firmly engaged by the mandrel.

* * * * *